United States Patent [19]

Bullock et al.

[11] Patent Number: 4,535,509
[45] Date of Patent: Aug. 20, 1985

[54] FISH-CLEANING MACHINE FINISHING SPRAY ACCESSORY

[75] Inventors: Kenneth W. Bullock, Seattle; Robert J. Story, Everett, both of Wash.

[73] Assignee: Smith Berger Marine, Inc., Seattle, Wash.

[21] Appl. No.: 511,433

[22] Filed: Jul. 6, 1983

[51] Int. Cl.³ .............................................. A22C 25/14
[52] U.S. Cl. ................................................. 17/58; 17/65
[58] Field of Search .................... 17/53, 65, 55, 58, 59

[56] References Cited

U.S. PATENT DOCUMENTS

| 998,129 | 7/1911 | Smith. | |
|---|---|---|---|
| 1,034,525 | 8/1912 | Smith. | |
| 1,119,104 | 12/1914 | Mohr | 17/65 |
| 1,179,101 | 4/1916 | Hendricks et al. | 17/58 X |
| 1,224,923 | 5/1917 | Haubner | 17/58 |
| 1,624,173 | 4/1927 | Lindquist | 17/58 |
| 1,819,060 | 8/1931 | Baader | 17/58 X |
| 2,054,576 | 9/1936 | Waugh | 17/65 X |
| 2,245,329 | 6/1941 | Danielsson | 17/58 X |
| 2,536,826 | 1/1951 | Taus | 17/3 |
| 3,453,684 | 7/1969 | Heck | 17/65 X |
| 3,456,287 | 7/1969 | Oates | 17/59 |

Primary Examiner—Willie G. Abercrombie
Attorney, Agent, or Firm—Robert W. Beach; Ward Brown

[57] ABSTRACT

An accessory for a fish-cleaning machine of the rotary bull ring type having rotary brushes adjacent to the peripheries of the bull rings, includes a nozzle projecting a flat fan-shaped glancing water spray into the nip between a rotary brush and the bull rings and, subsequently, two abreast nozzles adjacent to a spreader bar for spreading apart the belly cavity walls of a fish carried by the bull rings project two coplanar flat fan-shaped partially edgewise overlapping sprays. Such two abreast nozzles, a fixed contour brush and a wide angle spray nozzle are carried by geniculate mounting means spring-pressed toward the bull rings.

8 Claims, 7 Drawing Figures

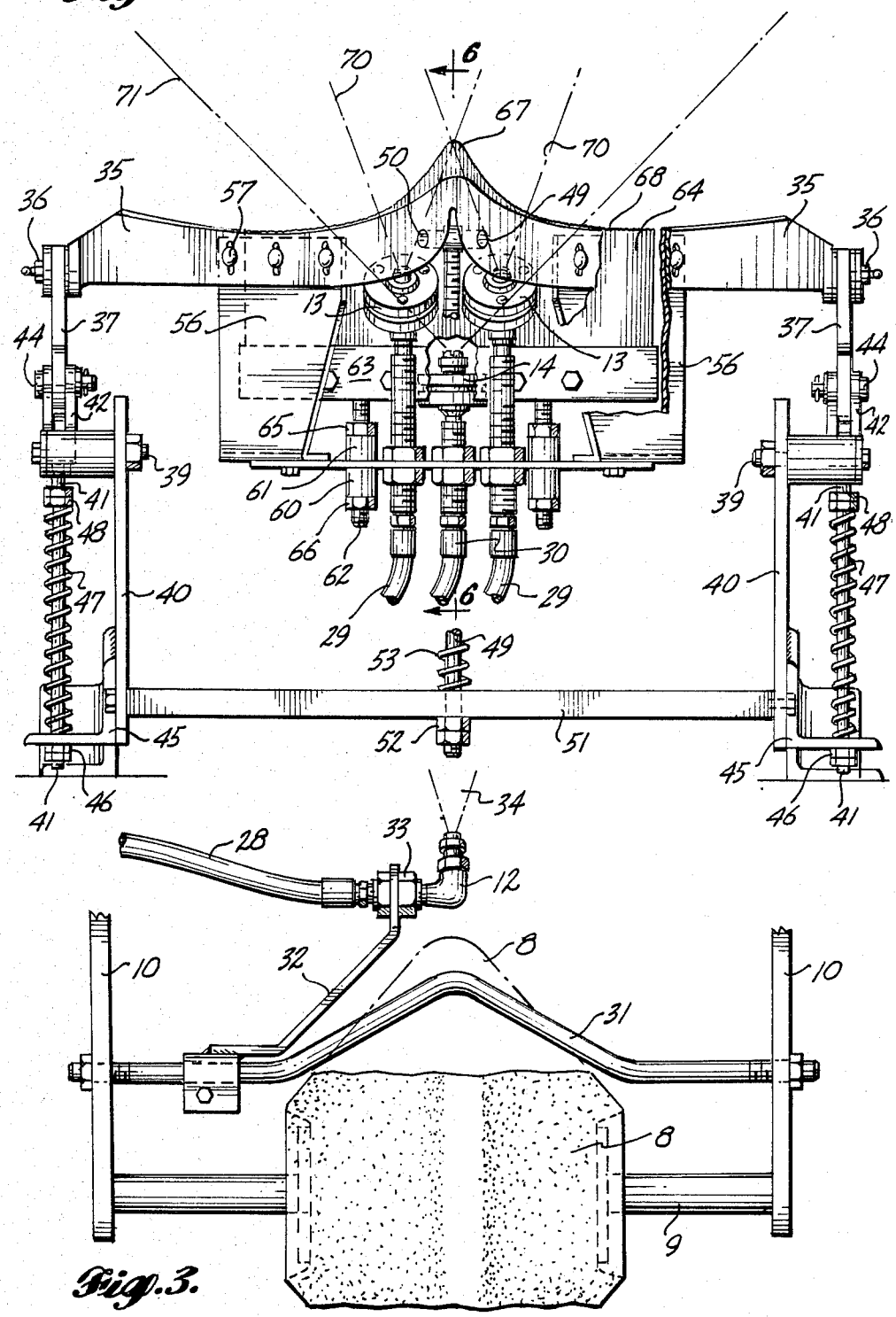

FISH-CLEANING MACHINE FINISHING SPRAY ACCESSORY

BACKGROUND OF THE INVENTION

1. Field of the Invention

The present invention relates to a finishing spray accessory particularly useful for incorporation in fish-cleaning machines of the bull ring type.

2. Prior Art

Fish-cleaning machines, particularly for cleaning salmon for canning, have been used for many years. Early patents for such machines include Smith U.S. Pat. No. 998,129, issued July 18, 1911 and Smith U.S. Pat. No. 1,034,525 issued Aug. 6, 1912. Such machines eviscerated beheaded salmon and saved much hand labor. Such machines, however, did not clean the fish cavity completely and various expedients have been used to improve the cleaning operation of such machines and thereby reduce the amount of hand labor required subsequent to the machine-processing to finish the fish preparatory to being canned.

Proposals have been made for washing the fish cavity in conjunction with scraping it to assist in removing the entrails. The Waugh U.S. Pat. No. 2,054,576, issued Sept. 15, 1936, provided for the bull wheel type of cleaning machine a combined scraping rib and water jet wheel which utilized herring-bone rubber ribs with rows of water-jet apertures between the ribs. Such apertures projected jets of water substantially perpendicularly against the surface of the fish belly cavity to assist the rubber ribs in dislodging and removing the entrails.

The later patent of Taus, U.S. Pat. No. 2,536,826, issued Jan. 2, 1951 proposed an accessory for the bull ring type of fish-cleaning machines which incorporated scraper plates having profiles generally conforming to the cavity of a fish, one or more of which scraper plates carried a central nozzle directed perpendicular to the surface of the fish cavity to project a jet of water into the cavity just as it is being attacked by the scraper plate itself. Such jet of water was stated to materially add to the effectiveness in removing the clotted blood from the backbone sack of the fish.

Later bull ring type of fish-cleaning machines, such as that shown in the Oates et al. U.S. Pat. No. 3,456,287, issued July 22, 1969, did not utilize water jets for scouring the cavity of the fish but provided sequential rotary brushes which brushed the walls of the fish cavity after it had been scraped by rotary scrapers.

SUMMARY OF THE INVENTION

It is an object of the present invention to provide a more complete cleaning of a fish belly cavity by use of a bull ring type of cleaning machine than has been possible heretofore so as to reduce or eliminate subsequent hand labor to complete the cleaning.

More specifically, it is an object to utilize water sprays to provide a finish cleaning or finishing step in a machine fish-cleaning operation.

In providing a water-spray finishing step in a fish-cleaning operation, it is an object to utilize water sprays effectively for finish cleaning without appreciably eroding or abrading the delicate flesh of the fish cavity.

Another object is to provide finishing spray apparatus for a fish-cleaning machine that will enable the proximity and attitude of sprays relative to a fish belly cavity wall, and also the volume and force of the sprays, to be adjusted so that the finishing sprays can be easily adapted to provide the preferred operation for each size, type and condition of fish being processed.

The foregoing objects can be accomplished by providing a central spray associated with a rotary brush and a cluster of sprays that are subsequently directed onto the surface of the fish cavity to provide a final flushing and rinsing action.

BRIEF DESCRIPTION OF THE DRAWINGS

FIG. 3 is a transverse section taken on line 3—3 of FIG. 2, having parts broken away.

FIG. 4 is a section through a portion of the finishing accessory taken on line 4—4 of FIG. 2.

DETAILED DESCRIPTION

Figure 1:
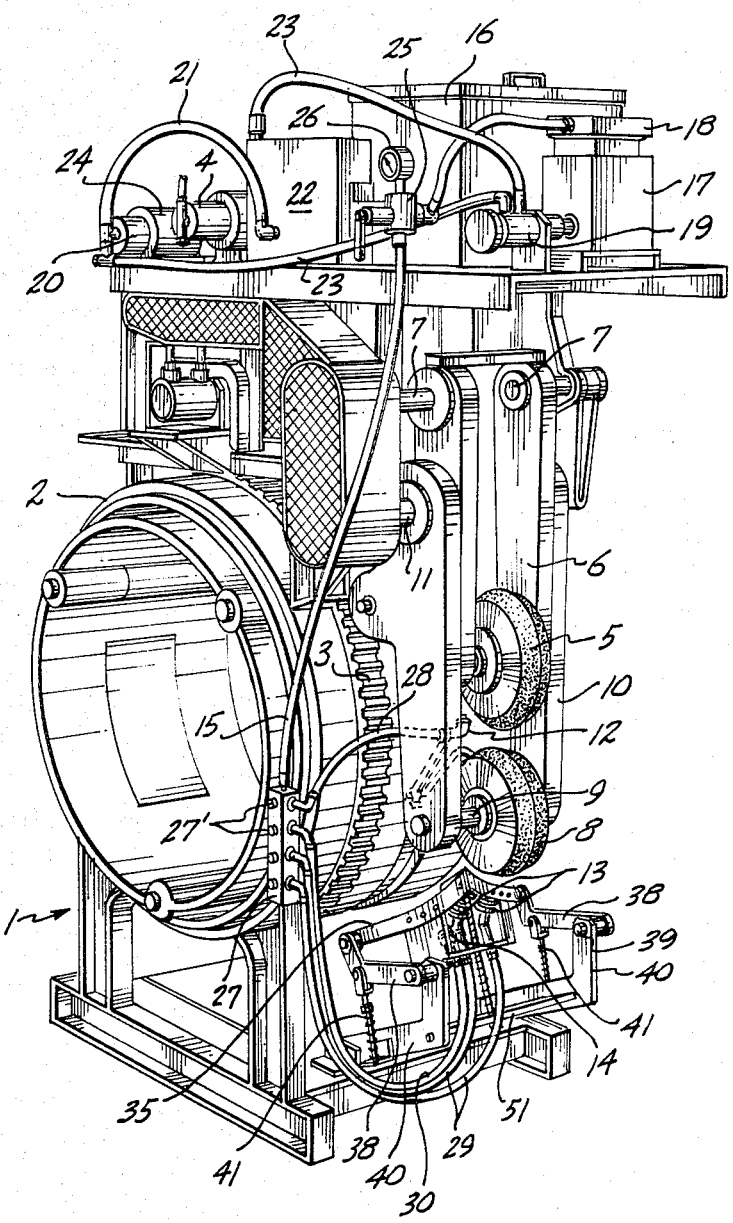
FIG. 1 is a perspective of a bull ring type of fish-cleaning machine to which a finishing spray accessory according to the present invention has been applied.

The bull ring fish-cleaning machine shown generally in FIG. 1 is of the type shown in Oates et al. U.S. Pat. No. 3,456,287 and, consequently, reference is made to that patent for a detailed description of the structure and operation of such a fish-cleaning machine. The present invention relates to a finishing accessory for such a fish-cleaning machine. Such a machine operates to eviscerate fish, particularly salmon, that have previously been beheaded and are then secured upon the bull rings 2 of the fish-cleaning machine which are rotated by a ring gear 3 driven by a hydraulic motor (not shown) to which hydraulic liquid is supplied by pump 4. As seen in FIG. 1, the bull rings are rotated in a clockwise direction and the fish are secured on them belly outward to move tail first.

After the tail and fins have been cut off, the belly has been cut open and the entrails have been scraped out, the cavity is brushed by two sequential rotary brushes. The first or upper brush 5 is journaled between the lower ends of depending arms 6 swingably mounted on trunnion shafts 7. The second or lower rotary brush 8 is rotatably mounted on a shaft 9 journaled in the lower ends of depending arms 10, the upper ends of which are journaled in shafts 11.

Rotating the bull rings 2 by a hydraulic motor enables the speed of such bull rings to be regulated as may be desired to keep pace with the canning line to which the fish cleaned by the fish-cleaning machine are delivered. Also, the rotary brushes 5 and 8 are rotated by a hydraulic motor (not shown), the speed of which can be regulated to rotate, the brushes 5 and 8 at a speed coordinated with the rotative speed of the bull rings 2 and at a speed to effect the most satisfactory cleaning operation, taking into consideration the rotative speed of the bull rings and the condition of freshness of the fish. The resilience of the fish flesh decreases with the period that elapses between it being caught and being cleaned. The less resilient the flesh, the more easily it is eroded and abraded by the rotating brushes.

Not only can the rotative speed of the brushes 5 and 8 be regulated, but the swung positions of the brush-supporting arms 6 and 10 can be altered to change the spacing between such brushes and the bull rings to accommodate fish of different size, as well as of different freshness. The fish-cleaning machine thus far described including the rotary brushes and their adjustability as to speed and proximity to the bull rings is not part of the present invention and has been previously used and described in Oates et al. U.S. Pat. No. 3,456,287.

Figure 2:
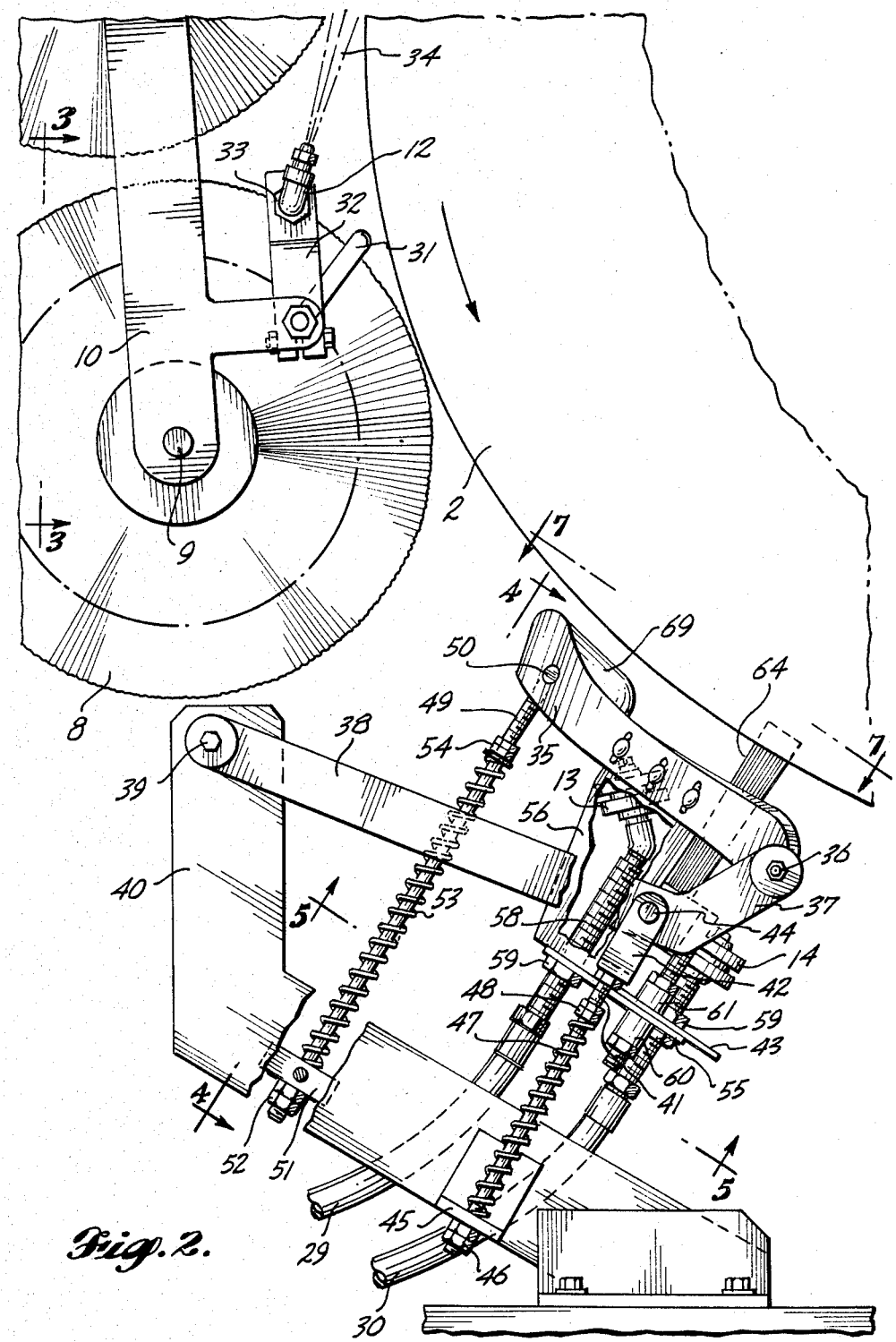
FIG. 2 is an enlarged side elevation of the finishing spray accessory with parts broken away.

The finishing spray accessory of the present invention includes a spray nozzle 12 carried by the supporting mechanism for the second rotary brush 8 and a cluster of three sprays mounted beyond the rotary brush 8 in the direction of rotation of the bull rings 2, as shown best in FIG. 2. Such cluster of sprays includes two nozzles 13 arranged abreast to direct skimming sprays toward approaching fish, and a third nozzle 14 at the trailing side of the two abreast nozzles in the direction of rotation of the bull rings for projecting a final wide angle rinsing spray onto the fish. The three nozzles of such cluster are carried by the same mounting mechanism.

A special water supply source is provided for supplying water to the four nozzles through a conduit 15 from a reservoir 16 shown in FIG. 1 in which the water level is regulated by a conventional float-controlled valve. Water is pumped from the reservoir by a water pump 17 through an outlet conduit 18 by a variable-speed hydraulic motor 19. Hydraulic liquid to drive such motor is supplied by a hydraulic pump 20 that obtains hydraulic liquid through a conduit 21 from a reservoir 22. Hydraulic liquid is delivered from the pump 20 to the motor 19 through a supply conduit and a return conduit 23. The hydraulic pump 20 is driven by an electric motor 24. The speed of the hydraulic motor 19 can be altered to adjust the quantity of water discharged by pump 17 to the outlet conduit 18.

The water outlet conduit 18 and the water supply conduit 15 are connected to a pressure regulator 25 that can be adjusted to control the pressure of the water flowing through the supply line 15 for any given volume of water. A pressure gauge 26 mounted on the pressure regulator indicates the pressure at which the water is delivered to the supply conduit 15.

The water supply conduit 15 is connected to a manifold 27 from which the water is distributed to the various nozzles 12, 13 and 14. A hose 28 connects the manifold and the nozzle 12, hoses 29 connect the manifold and the nozzles 13 and a hose 30 connects the manifold and the nozzle 14. Needle valves 27' in the manifold are adjustable to meter the amount of water supplied by the supply conduit 15 to each of the four nozzles independently.

FIGS. 2 and 3 show in detail the installation of the forward nozzle 12 which is supported on the carrier for the second rotary brush 8. The two brush-supporting arms 10 are connected by a spreader rod 31 which serves the dual function of maintaining the free ends of arms 10 in definitely spaced relationship and holding the sides of the fish to be cleaned spread apart. For the latter purpose, the central portion of the spreader rod is bent at an obtuse angle, as shown in FIG. 3, and such bent portion projects toward the bull rings 2 in the direction opposite their direction of rotation so that the plane of such portion is at an acute angle to the ring peripheries, as shown in FIG. 2.

The nozzle 12 is supported from the spreader rod 31 by a bracket 32 having in its free end an aperture through which the support for the nozzle extends, and which support is secured to the bracket by opposite nuts 33 screwed onto the nozzle support. The bracket 32 is located and proportioned so that the spray opening of the nozzle 12 is disposed in a plane perpendicular to the rotational axes of the brush 8 and of the bull rings and, as shown in FIG. 2, the nozzle is spaced from the periphery of the bull rings.

The nozzle 12 projects a flat, fan-shaped skimming spray 34 which preferably is directed substantially into the nip between the first rotary brush 5 and the bull rings 2 so that the spray will engage the fish cavity wall at a small glancing angle, i.e. the angle between the spray and the body cavity wall, such as between 5 and 45 degrees. The fan-shaped spray 34 has a fan angle of about 15 degrees, as shown in FIG. 3, and is disposed with the plane of the spray substantially parallel to the rotative axis of the bull rings. The glancing angle of the spray can be adjusted by turning the angle mount of the nozzle relative to bracket 32 and clamping the nozzle mount in the adjusted position by tightening nuts 33, or by swinging bracket 32 relative to spreader rod 31, or both.

Figure 5:
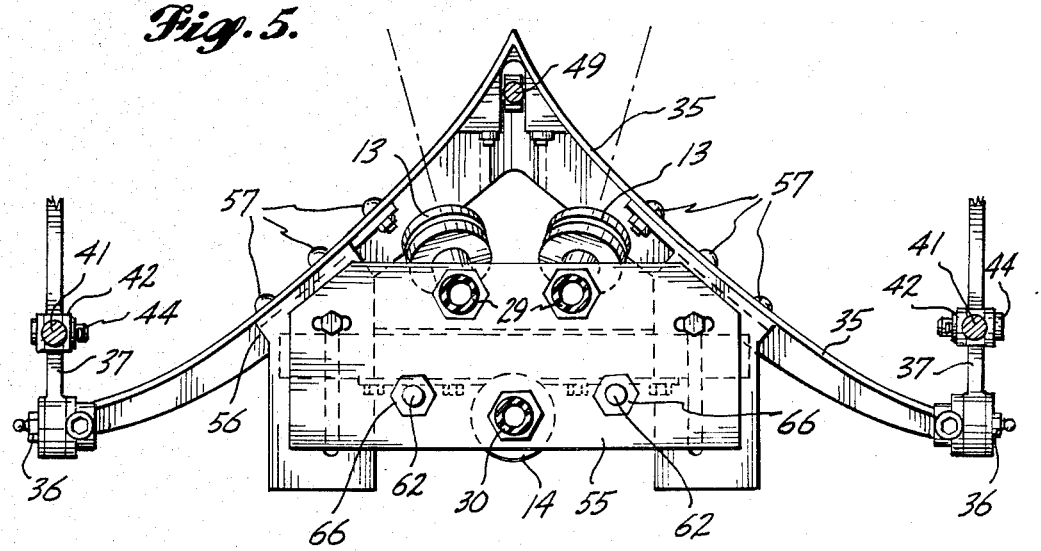
FIG. 5 is a section of the finishing accessory taken along 5—5 of FIG. 2.
Figure 7:
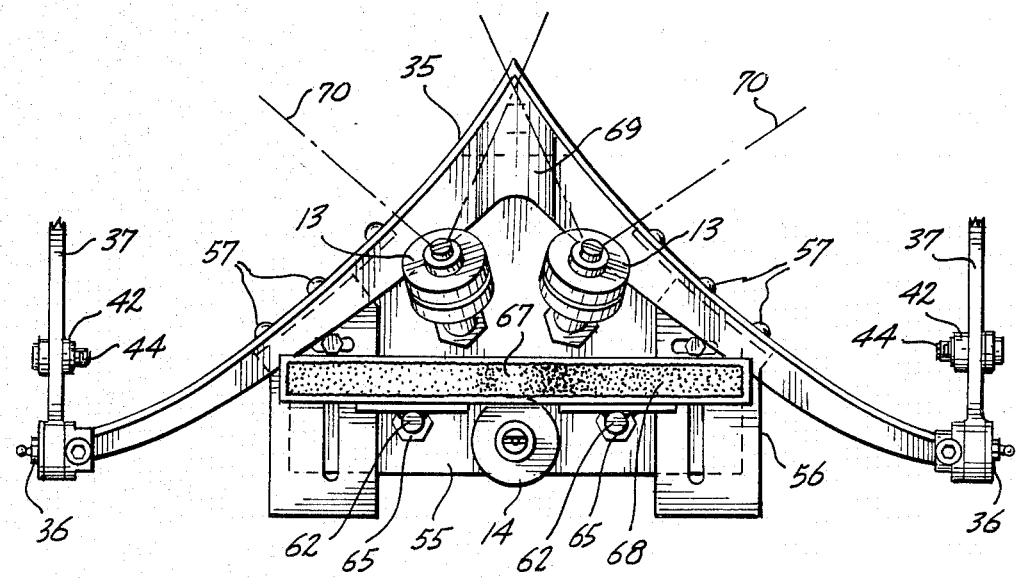
FIG. 7 is a view of a portion of the finishing accessory as viewed from line 7—7 of FIG. 2.

The mounting for the nozzles 13 and 14 includes a spreader bar 35 having its opposite ends mounted by pivots 36 on bent tips 37 of arms 38. As shown best in FIGS. 5 and 7, the spreader bar 35 is of ploughshaped profile having two concave wings meeting in a cusp, as shown in FIGS. 5 and 7, directed toward approaching fish and opposite to the direction of rotation of the bull rings, as shown in FIG. 2. As also shown in FIG. 2, the arms 38 are in a plane generally parallel to the plane of the spreader bar, and these parts are spaced by the bent tips 37 of the supporting arms so as to form with the spreader bar a deformable geniculate structure. The ends of supporting arms 38 remote from their bent tips 37 are connected by pivots 39 to the upper ends of rigidly-mounted base struts 40. Thus the geniculate mounting for the spreader bar includes the spreader bar link 35 pivotally connected to the supporting links 38 by pivots 36 in folded relationship. The folded linkage is connected to the frame 40 by pivots 39. Both links are generally parallel to the periphery of the bull rings 2 as shown in FIG. 2.

It is desirable for the spreader bar wings to support the sides of a fish and hold them spread substantially against the peripheries of the bull rings 2. Because the fish-cleaning machine will be used to clean fish of different size which, consequently, have different body thicknesses, and because the thickness of the body of a fish decreases toward the beheaded end of the fish and outwardly from the backbone of the fish, it is desirable to have the spreader bar mounted for movement toward and away from the peripheries of the bull rings to accommodate the position of the spreader bar to different body thicknesses. To accomplish this objective, the geniculate spreader bar mounting is deformably and bodily shiftable because of the pivotal connections 36 and 39 of its components. The shape of the mounting will be altered automatically in response to the thickness of a fish engaged by the spreader bar because the principal components of the mounting are hingedly connected and resiliently urged independently toward the peripheries of the bull rings.

In order to urge the ploughshaped spreader bar 35 bodily toward the bull rings 2 the supporting arms 38 are urged to swing toward the bull rings about their pivots 39. To accomplish this operation, threaded rods 41 have clevises 42 secured to their ends adjacent to the support bars 38 by locknuts 43. Such clevises straddle the support arms 38 and are pivotally connected to them by pivot pins 44. The opposite ends of the threaded rods 41 extend through apertures in fixed angle brackets 45. Movement away from such brackets is limited by locknuts 46 threaded on the ends of the rods 41.

A helical compression spring 47 encircling each threaded rod 41 is engaged between the side of an angle bracket 45 opposite the locknuts 46 and locknuts 48 threaded on the rod 41 adjacent to the clevis 42. Such spring reacting between the angle bracket 45 and the locknuts 48 will urge the threaded rod 41 away from the angle bracket to swing the bent tip 37 of the support rod 38, and, consequently, the spreader bar 35, toward the bull rings 2. The limiting upper position of pivots 36 can be adjusted by altering the position of locknuts 46 on the threaded rods 41, and the force exerted by such springs can be altered by adjusting the positions of locknuts 48 along rods 41. Moving the locknuts 48 toward the locknuts 46 will precompress springs 47 and increase the force that they exert.

The mechanism described will control the proximity of the outer ends of the spreader bar 35 to the bull rings 2 and the force with which such ends of the spreader bar are urged toward the bull rings. The proximity of the spreader bar cusp to the bull rings and the force with which it is urged toward the bull rings is controlled by spring mechanism connected between the apex of the spreader bar and the base struts 40. Such spring mechanism includes the threaded rod 49 having its upper end connected by the pivot crosspin 50 to the apex of the spreader bar 35. The lower end of such threaded rod extends through an aperture in a connecting bar 51 connecting the two struts 40.

Upward lengthwise movement of the threaded rod is limited by engagement of locknuts 52 on the rod adjacent to its lower end with the underside of the connecting bar 51. The threaded rod is urged lengthwise upwardly by a helical compression spring 53 encircling the threaded rod 49, the lower end of which is engaged with the connecting bar 51 and the upper end of which engages locknuts 54 threaded on the rod 49. The upper limiting position of the apex of the spreader bar 35 is limited by the position of the locknuts 52 on the lower end of the threaded rod 49, and the force with which the apex of the spreader bar is urged toward the bull rings is established by the location of the locknuts 54 on the rod 49. The closer such locknuts are to the locknuts 52, the more spring 53 will be precompressed and the greater will be the upward force which it exerts on the apex of the spreader bar 35.

The cluster of nozzles 13 and 14 is mounted on a platform 55 suspended from the spreader bar 35 by plates 56, the upper edges of which plates are attached to the wings of the spreader bar 35 by bolts or rivets 57. Each of the nozzles is carried by a threaded tube 58 secured to the platform by locknuts 59. By adjusting the positions of such locknuts along the threaded tubes 58, the proximity of the nozzles to the spreader bar 35 and, consequently, to the bull rings 2, can be adjusted.

In addition to carrying the cluster of nozzles, the platform 55 carries a fixed contour brush. Through spacer sleeves 60 and 61 located below and above the platform 55, respectively, and apertures in the platform, extend threaded rods 62 depending from the back 63 of a contour brush 64. The sleeves 60 and 61 are clamped between upper nuts 65 and lower nuts 66 threaded on the rods 62 to clamp the brush in place. The elevation of the brush back 63 relative to the platform 55 can be adjusted by altering the positions of the nuts 65 and 66 along the rods 62. The central portion 67 of the brush bristles protrudes upwards from the side portions 68 of the brush so as to shape the upper portion of the brush generally complemental to a cross section of the fish spread open on the bull rings 2 for cleaning.

Figure 6:
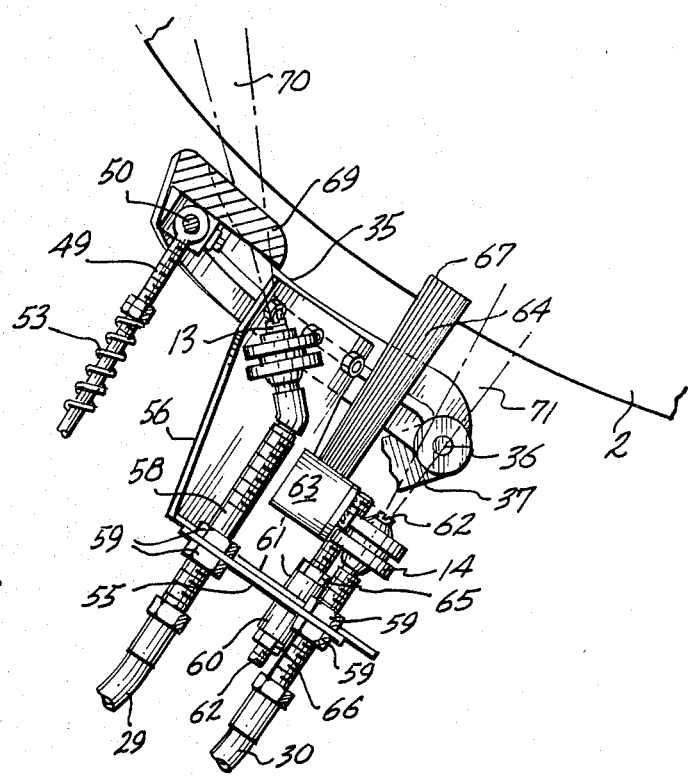
FIG. 6 is a fragmentary section of a portion of the finishing accessory similar to FIG. 2, but with additional parts broken away.

The position of the spreader bar apex relative to a fish is established by a gauge shoe or pilot shoe 69 mounted in such apex as shown best in FIGS. 2 and 6. Such pilot shoe rides on the inner side of the backbone of the fish backed by the bull rings 2 which depresses the apex of the spreader bar against the force of spring 53 in order to maintain contact between the spreader bar and the interior wall of the fish cavity. The outer portions of the spreader bar are held against the wall of the fish cavity by the springs 47 urging the swinging ends of the supporting bars 38 toward the bull rings 2.

Each of the sprays 70 projected by abreast nozzles 13 is a flat, fan-shaped spray, preferably having a fan angle of about 40 degrees. The fan-shaped sprays of the two nozzles 13 are approximately coplanar and the sprays are directed so as to overlap edgewise at approximately the location of impact against the fish cavity wall. The supports for the nozzles are angled as seen in FIGS. 2 and 6 so that the sprays of such nozzles are directed toward an approaching fish at a small, glancing angle between 5 degrees and 45 degrees to provide a skimming action for stripping visceral residue from the fish belly cavity walls.

The angle shape of the mounts for nozzles 13 enables the relative divergence of the sprays of the abreast nozzles to be adjusted by turning the tubes 58. The sprays are positioned so that their substantially coplanar relationship is parallel to the rotative axis of the bull rings 2. As described above, the proximity of the nozzles to the spreader bar 35 and fish cavity can be altered by adjusting the threaded tubes 58 lengthwise. As seen in FIG. 4, the nozzles 13 are located sufficiently far apart so as to spray generally alongside the opposite sides of shoe 69 and the elevational positions of the nozzles 13 are adjusted taking into consideration the degree of bend of their mounts so that their sprays will engage portions of the fish cavity wall that have passed the spreader bar 35.

The spray 71 emitted by nozzle 14 is a wide angle flat fan-shaped spray, preferably having a fan angle of approximately 95 degrees. Such spray is shown as being directed substantially perpendicularly onto a portion of the fish cavity wall after it passes brush 64. Adjustment of nozzle 14 toward or away from the bull rings relative to the mounting platform 55, as previously described, will alter the force with which this spray strikes the fish cavity wall, as well as the transverse extent of the fish cavity covered by the spray.

In the operation of the fish-cleaning machine shown in FIG. 1, a fish has been eviscerated prior to its cavity being engaged by the first brush 5. At that point, however, residual blood or viscera may still be adhering to the wall of the belly cavity, particularly alongside the backbone. The brush 5 attacks such viscera remnants rotating in the direction opposite the direction of rotation of the bull rings 2. Directing a concentrated spray 34 into the nip between the brush 5 and the bull rings as indicated in FIG. 2 greatly assists scouring or stripping of the viscera remnants, particularly along the backbone. The skimming action of the spray wedges or peels clinging visceral remains from the cavity wall. The residue thus stripped from the cavity wall by the purging action of the spray can then be brushed out of the cavity more readily by the succeeding rotary brush 8, which also rotates in the direction opposite the direction in which the bull rings 2 rotate.

When the central portion of the belly cavity of a fish carried by the bull rings 2 engages the pilot shoe 69, the spreader bar 35 is pushed away from the bull rings to the extent required to pass the fish without appreciable scraping of its cavity wall by the spreader bar. By such action, however, the nozzles 13, the brush 64 and the nozzle 14 are positioned so that the nozzles 13 provide a rather widely distributed skimming spray with sufficient force to scavenge any visceral remnants. Such remnants as may thus be dislodged but not removed from the belly cavity will be brushed out of the cavity by the fixed contour brush 64. Finally, the cavity is gently rinsed by the wide-angle spray 71 discharged by nozzle 14. At this point, the fish cavity is nearly inverted so that the water drains readily from the cavity to complete a finished eviscerating operation requiring very little, if any, manual finishing to be done.

We claim:

1. A finishing accessory for a bull ring type of fish-cleaning machine having rotatable bull rings for carrying a fish comprising a spreader bar adjacent to the periphery of the bull rings but spaced therefrom, and geniculate mounting means including a pair of links composed of a first link pivotally mounted by stationary pivot means and arranged generally parallel to the periphery of the bull rings and a second link pivotally connected to said first link in a position folded relative thereto by a pivot spaced from said stationary pivot means and arranged generally parallel to the periphery of the bull rings and supporting said spreader bar for movement toward and away from the periphery of the bull rings and for engagement with the belly cavity walls of a fish carried by the bull rings for spreading such walls apart.

2. The accessory defined in claim 1, and spring means urging the second link of the geniculate mounting means toward the bull rings.

3. A finishing accessory for a bull ring type of fish-cleaning machine having rotatable bull rings for carrying a fish and a rotary cleaning brush engageable with the belly cavity of a fish carried by the rotatable bull rings comprising skimming spray means offset circumferentially of the bull rings from the rotary cleaning brush and located at the side of the rotary cleaning brush away from which the bull rings move for projecting a spray of water directed onto the walls of the fish belly cavity at a small glancing angle between the spray and the fish belly cavity wall within the range of 5 degrees to 45 degrees generally in the direction opposite the direction in which the fish is moved toward said spray means by the bull rings and substantially into the nip between the periphery of the rotary cleaning brush and the periphery of the bull rings.

4. A finishing accessory for a bull ring type of fish-cleaning machine having rotatable bull rings for carrying a fish and a rotary brush engageable with the belly cavity of a fish carried by the rotatable bull rings comprising first skimming spray means for projecting a spray of water directed at a small glancing angle within the range of 5 degrees to 45 degrees onto the walls of the fish belly cavity substantially into the nip between the periphery of the rotary cleaning brush and the periphery of the bull rings, a spreader bar adjacent to the periphery of the bull rings but spaced therefrom, geniculate mounting means including a pair of pivotally mounted and pivotally connected folded links arranged generally parallel to the periphery of the bull rings supporting said spreader bar for movement toward and away from the periphery of the bull rings and engageable with the belly cavity walls of a fish carried by the bull rings for spreading such walls apart, spring means urging said geniculate mounting means toward the bull rings, and second skimming spray means carried by said geniculate mounting means and including two abreast nozzles projecting two flat fan-shaped sprays arranged in substantially coplanar relationship onto the walls of the fish belly cavity at a small glancing angle within the range of 5 degrees to 45 degrees.

5. The finishing accessory defined in claim 4, including contour fixed brush means carried by a link of the geniculate mounting means for engagement with the walls of the fish belly cavity at a location following the location at which the second skimming spray means strikes the fish belly cavity walls, and rinsing spray means at the side of said brush means opposite the second skimming spray means.

6. A finishing accessory for a bull ring type of fish-cleaning machine having rotatable bull rings for carrying a fish comprising a spreader bar adjacent to the periphery of the bull rings but spaced therefrom, geniculate mounting means including a pair of links composed of a first link pivotally mounted by stationary pivot means and a second link pivotally connected to said first link in a position folded relative thereto by a pivot spaced from said stationary pivot means and supporting said spreader bar for movement toward and away from the periphery of the bull rings for engagement with the belly cavity walls of a fish carried by the bull rings for spreading such walls apart, spring means urging said geniculate mounting means toward the bull rings, and skimming spray means carried by a link of said geniculate mounting means and including two abreast nozzles projecting two flat fan-shaped sprays onto the walls of the fish belly cavity at a small glancing angle between the spray and the fish belly cavity wall within the range of 5 degrees to 45 degrees.

7. A finishing accessory for a bull ring type of fish-cleaning machine having rotatable bull rings for carrying a fish comprising skimming spray means for projecting a spray of water directed at a small glancing angle within the range of 5 degrees of 45 degrees onto the walls of the fish belly cavity in the direction opposite the direction in which the fish is moved toward said spray means by the bull rings, a nonrotative contour brush for brushing the walls of the fish belly cavity after they have been skimmed by said skimming spray means, supporting means supporting said brush for movement toward and away from the bull rings, spring means urging said supporting means toward the bull rings, and rinsing spray means at the side of said brush opposite said skimming spray means for spraying the walls of the fish belly cavity.

8. The accessory defined in claim 7, in which the skimming spray means includes two abreast nozzles projecting two flat fan-shaped sprays arranged in substantially coplanar relationship, the fan angle of each of said sprays being approximately 40 degrees.

* * * * *